July 27, 1926.
B. W. HURD
1,593,766
VALVE
Filed Dec. 8, 1924
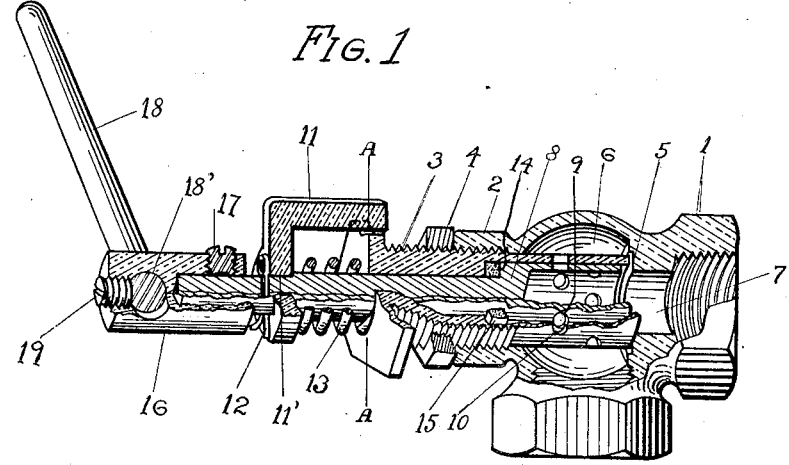
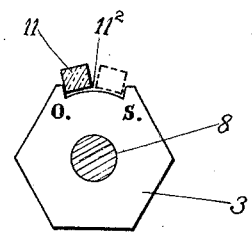
INVENTOR.
B W Hurd
BY Harry F Totten
ATTORNEY Patented July 27, 1926.

1,593,766

UNITED STATES PATENT OFFICE.

BENJAMIN W. HURD, OF SAN FRANCISCO, CALIFORNIA.

VALVE.

Application filed December 8, 1924. Serial No. 754,474.

The present invention relates to improvements in valves, and more particularly to a type of valve for controlling fluid pressure, and which may be operated manually or automatically by hydrostatic or thermostatic means.

Among the objects of my improved valve are, first, to provide a primary means for increasing or decreasing the flow of fluid through the valve; second, to provide a secondary means of adjustment which will permit a definite flow of fluid to by-pass through the valve independently of the flow controlled by the primary controlling means; third, to afford facilities for adjusting the valve to obtain the desired secondary flow, and, fourth, to provide means to maintain the valve leak-proof.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings forming part of this invention, and wherein—

Figure 1 is a view in perspective of a valve partly broken away.

Figure 2 is a transverse sectional view of the valve on line A—A of Figure 1, viewed from the left.

In the drawings, wherein like characters of reference designate corresponding parts, 1 indicates a valve body provided with a threaded flange 2 into which the control sleeve 3 is screwed and locked in place by the lock nut 4 which is tightened against the valve body 1. The control sleeve 3 is capable of longitudinal adjustment within the valve body by being screwed thereinto, so that the inner end will seat against the seat, as at 5, in which case fluid is precluded from flowing from the chamber 6 to chamber 7 at that point, or, the sleeve may be threaded outwardly to afford a space between its inner end and seat 5, in which case a definite flow may be maintained at all times between chambers 6 and 7.

This adjustment acts as a pilot flow or a secondary means of flow control, which is referred to in the above set forth objects.

A control sleeve rod 8 is fitted into the sleeve 3 and is provided with a plurality of holes 9 which correspond and are adapted to register with the corresponding series of holes 10 in the control valve 3, this being accomplished by turning the control rod 8.

The operation of the control rod enables the holes to be closed off entirely or varied to any intermediate degree from closed to full registering position, such operation controlling the fluid flow from chamber 6 to 7.

An indicator stop pin 11 is fitted to the squared portion 11' of the control sleeve rod 8, and is held in place to rotate with the control sleeve rod by a cotter pin or other securing means 12. The hub of the stop pin 11 bears against one end of and compresses a spring 13 against the hexagon head of the controlling sleeve 3; this causes the shoulder 14 of the control rod 8 to be pressed against the sealing washer or packing 15 which prevents leakage at this point. The hexagon head of the control sleeve 3 is provided with a recess $11^2$ into which the indicator stop pin 11 is received, as in Fig. 2. As the control sleeve rod 8 is thrown full over, either to the right or left, the indicator stop pin 11 will strike against either the stop O or the stop S, and when against the former, as shown in full lines in Fig. 2, the apertures 9 and 10 are in full register, and the valve is full open. When the indicator stop pin 11 is against the stop marked S, as in dotted lines, Fig. 2, the holes or apertures 9 and 10 are out of register, and the valve is shut. This movement of the holes 9 and 10 into or out of alignment acts as a primary means of flow control, above referred to.

A suitable operating handle or means may be carried by the control rod 8, that form illustrated consisting of a hub 16 fitted over the end of the rod and adjustably held in position by a set screw 17. Laterally from the hub extends the rod 18 adjustable transversely through the bore 18' in the hub and adapted to be held in this adjusted position by a lock screw 19.

The initial setting of the control sleeve 3 provides a control for the by-pass of fluid through the valve, and the rotation of the member 8 therein, which is accomplished independently of the movement of the member 3, controls the flow of the main body of fluid through the valve.

I claim:—

In combination with a valve casing having fluid inlet and outlet ports and provided with a valve seat surrounding one of said ports, a tubular sleeve valve threaded within the casing and adapted at one end to coact with said seat, said valve provided at its opposite end with a polygonal flange recessed to afford a plurality of stops and provided with a perforated wall for reception within the casing, and a second tubular sleeve rotatably mounted within the first and provided with a ported wall adapted on its rotation to bring its ports into register with the ports of the wall of the first valve, a stem extending from the second valve and projecting beyond and through the polygonal end portion of the first tubular valve, an operating handle carried by the stem, a stop arm carried by and rotatable with the stem and adapted to coact with said stops to limit the rotation of the second sleeve valve within the first and to adjust the first tubular sleeve valve relatively to its seat, a gland packing between the inner and outer valves, a spring bearing against the polygonal end of the first tubular valve, surrounding the stem, and bearing against said stock arm for maintaining the gland packing under compression, and releasable means for holding said sleeve valve in its adjusted position relatively to said seat.

In testimony whereof I have signed my name to this specification.

BENJAMIN W. HURD.